US009823921B2

United States Patent
Mavinakayanahalli et al.

(10) Patent No.: US 9,823,921 B2
(45) Date of Patent: *Nov. 21, 2017

(54) SELECTIVELY HOTPATCHING ONLY A SELECTION OF PROCESSES OF A RUNNING INSTANCE OF AN APPLICATION THAT MATCH A SELECTION CRITERIA

(71) Applicant: INTERNATIONAL BUSINESS MACHINES CORPORATION, Armonk, NY (US)

(72) Inventors: Ananth N. Mavinakayanahalli, Bangalore (IN); Aravinda Prasad, Mysore (IN); Suzuki K. Poulose, Cambridge (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,550

(22) Filed: Sep. 17, 2016

(65) Prior Publication Data

US 2017/0039061 A1 Feb. 9, 2017

Related U.S. Application Data

(63) Continuation of application No. 14/591,702, filed on Jan. 7, 2015, now Pat. No. 9,459,858.

(51) Int. Cl.
*G06F 9/44* (2006.01)
*G06F 9/445* (2006.01)
*G06F 11/30* (2006.01)

(52) U.S. Cl.
CPC .............. *G06F 8/67* (2013.01); *G06F 8/71* (2013.01); *G06F 11/3017* (2013.01); *G06F 11/3093* (2013.01)

(58) Field of Classification Search
CPC ..................................... G06F 8/67; G06F 8/71
(Continued)

(56) References Cited

U.S. PATENT DOCUMENTS 5,611,043 A    3/1997  Even et al.
5,859,977 A *  1/1999  Nishiyama ................ G06F 8/65
                                                      709/223

(Continued)

OTHER PUBLICATIONS

"Internal Watchpoints—GDB WIKI", accessed online via the Internet at <https://sourceware.org/gdb/wiki/Internals%20Watchpoints> as of Jun. 30, 2014, 4 pages.

(Continued)

*Primary Examiner* — Lewis A Bullock, Jr.
*Assistant Examiner* — Theodore Hebert
(74) *Attorney, Agent, or Firm* — Amy J. Pattillo; Steven L. Bennett

(57) ABSTRACT

An application is modified during execution by a hotpatch controller of a kernel receiving one or more new versions of a selection of one or more functions of multiple functions of an application and at least one selection criteria for applying the one or more new versions to the application during execution of the application to update a selection of one or more existing versions of the one or more functions. The hotpatch controller selectively transfers control from the selection of one or more existing versions of the one or more functions to the one or more new versions for only a selection of one or more processes that call the selection of one or more existing versions of the one or more functions from among multiple processes of the application, the selection of one or more processes each comprising one or more attributes matching the at least one selection criteria.

18 Claims, 8 Drawing Sheets

(58) Field of Classification Search
USPC .......................................................... 717/170
See application file for complete search history.

(56) References Cited

U.S. PATENT DOCUMENTS

| | | | | |
|---|---|---|---|---|
| 6,173,386 | B1* | 1/2001 | Key | G06F 11/3648 712/10 |
| 7,500,245 | B2* | 3/2009 | Ben-Zvi | G06F 8/67 710/260 |
| 7,669,189 | B1* | 2/2010 | Umamageswaran | G06F 11/3471 711/100 |
| 8,037,459 | B2 | 10/2011 | Mavinakayanahalli et al. | |
| 8,261,247 | B2* | 9/2012 | Arnold | G06F 8/67 717/140 |
| 8,607,208 | B1* | 12/2013 | Arnold | G06F 8/67 717/129 |
| 2003/0084375 | A1* | 5/2003 | Moore | G06F 11/362 714/34 |
| 2004/0107416 | A1* | 6/2004 | Buban | G06F 8/68 717/170 |
| 2005/0081184 | A1* | 4/2005 | Deedwaniya | G06F 9/44521 717/100 |
| 2006/0294433 | A1* | 12/2006 | Thelen | G06F 11/362 714/38.13 |
| 2007/0011686 | A1* | 1/2007 | Ben-Zvi | G06F 8/67 719/310 |
| 2009/0083268 | A1* | 3/2009 | Coqueret | G06F 8/71 |
| 2009/0259999 | A1* | 10/2009 | Srinivasan | G06F 8/62 717/170 |
| 2010/0205587 | A1* | 8/2010 | Dai | G06F 8/67 717/140 |
| 2010/0251026 | A1* | 9/2010 | Panchamukhi | G06F 11/362 714/38.13 |
| 2010/0269106 | A1* | 10/2010 | Arnold | G06F 8/67 717/168 |
| 2011/0145806 | A1* | 6/2011 | Cook | G06F 8/67 717/170 |
| 2012/0150935 | A1* | 6/2012 | Frick | G06F 17/30548 709/201 |
| 2014/0283056 | A1* | 9/2014 | Bachwani | G06F 21/56 726/23 |
| 2015/0007156 | A1* | 1/2015 | Tkach | G06F 8/67 717/170 |
| 2016/0196135 | A1 | 7/2016 | Mavinakayanahalli | |

OTHER PUBLICATIONS

Non-Final Office Action, dated Jan. 21, 2016, U.S. Appl. No. 14/591,702, filed Jan. 7, 2015, In re Mavinakayanahalli, 33 pages.
Notice of Allowance, dated Jun. 8, 2016, U.S. Appl. No. 14/591,702, filed Jan. 7, 2015, In re Mavinakayanahalli, 36 pages.

* cited by examiner

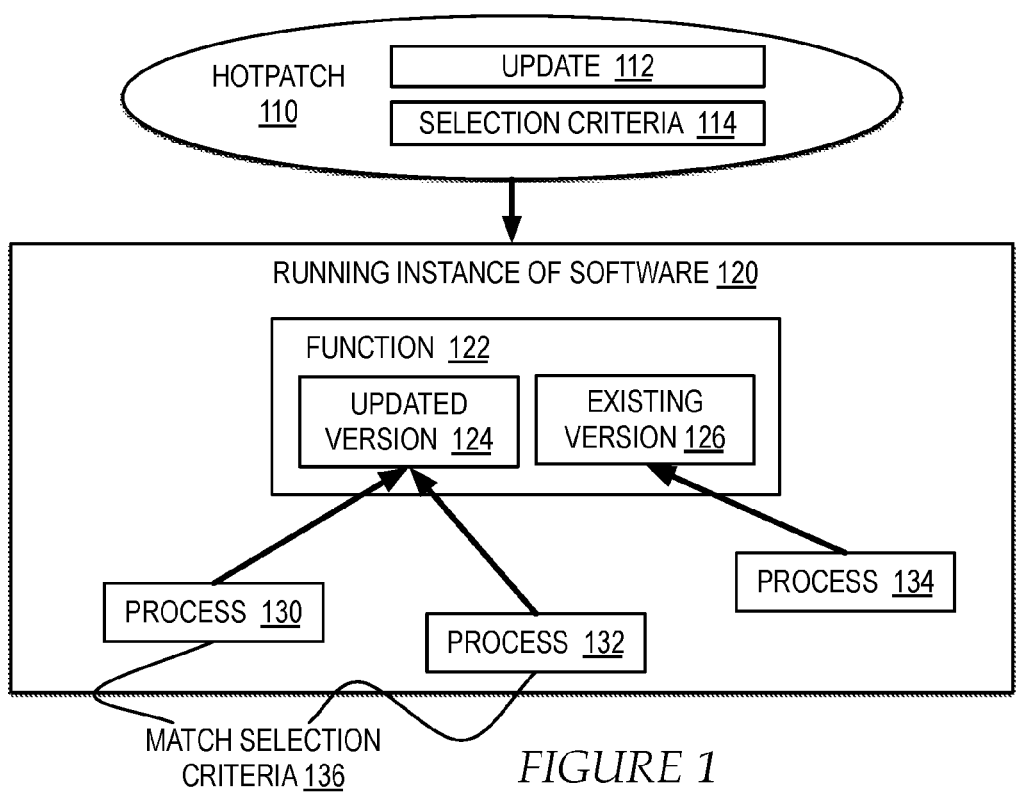

*FIGURE 1*

| SELECTION CRITERIA SPECIFICATION 202 |
|---|

| STATIC SELECTION 210 |
|---|
| PROCESS IDENTIFIERS (PROCESS NAME, PROCESS ID, PROCESS GROUP ID) 212 |
| OWNER OF THE PROCESS (USER ID OF THE PROCESS, GROUP ID OF THE PROCESS 214 |
| CLASSIFICATION OF THE HOTPATCH (SECURITY, PERFORMANCE) 216 |

| DYNAMIC SELECTION 220 |
|---|
| STATIC SELECTIONS 222 |
| DATE/TIME 224 |
| PROGRAM CONTEXT OF THE PROCESS (VALUES OF GLOBAL VARIABLE, LOCAL VARIABLE, FUNCTION PARAMETERS) 226 |
| USER-DEFINED HANDLER FOR FILTERING 228 |

*FIGURE 2*

SELECTIVELY HOTPATCHING ONLY A SELECTION OF PROCESSES OF A RUNNING INSTANCE OF AN APPLICATION THAT MATCH A SELECTION CRITERIA

TECHNICAL FIELD

The embodiment of the invention relates generally to hotpatching applications and particularly to selectively hotpatching only a selection of processes of a a running instance of an application that match a selection criteria.

DESCRIPTION OF THE RELATED ART

While applications are running, a user may apply a software patch to the application without requiring the application to be rebooted or restarted, also called hotpatching.

BRIEF SUMMARY

There are instances when hotpatching is applied to accesses to functions by all processes of an application, but only needs to be applied selectively, to only a selection of processes of an application. There is a need for a method, system, and computer program product for selectively hotpatching processes of a running instance of an application.

In one embodiment, a method for modifying an application during execution of the application is directed to receiving, using one or more processors, one or more new versions of a selection of one or more functions of multiple functions of an application and at least one selection criteria for applying the one or more new versions to the application during execution of the application to update a selection of one or more existing versions of the one or more functions. The method is directed to updating, using the one or more processors, the selection of one or more functions of the application, while the application is running, to comprise the one or more new versions of the selection of one or more functions at a second address while maintaining the selection of the one or more existing versions of the one or more functions at a first address. The method is directed to selectively transferring control, using the one or more processors, from the selection of one or more existing versions of the one or more functions to the one or more new versions at the second address for only a selection of one or more processes that call the selection of one or more existing versions of the one or more functions from among multiple processes of the application, the selection of one or more processes each comprising one or more attributes matching the at least one selection criteria.

In another embodiment, a system for modifying an application during execution of the application comprises a processor, coupled with a memory, and configured to perform the actions of receiving one or more new versions of a selection of one or more functions of a plurality of functions of an application and at least one selection criteria for applying the one or more new versions to the application during execution of the application to update a selection of one or more existing versions of the one or more functions. The system comprises the processor, coupled with the memory, and configured to update the selection of one or more functions of the application, while the application is running, to comprise the one or more new versions of the selection of one or more functions at a second address while maintaining the selection of the one or more existing versions of the one or more functions at a first address. The system comprises the processor, coupled with the memory, and configured to selectively transferring control from the selection of one or more existing versions of the one or more functions to the one or more new versions at the second address for only a selection of one or more processes that call the selection of one or more existing versions of the one or more functions from among a plurality of processes of the application, the selection of one or more processes each comprising one or more attributes matching the at least one selection criteria.

In another embodiment, a computer program product for modifying an application during execution of the application comprises a computer readable storage medium having program instructions embodied therewith. The program instructions are executable by a processor to cause the processor to receive one or more new versions of a selection of one or more functions of a plurality of functions of an application and at least one selection criteria for applying the one or more new versions to the application during execution of the application to update a selection of one or more existing versions of the one or more functions. The program instructions are executable by a processor to cause the processor to update the selection of one or more functions of the application, while the application is running, to comprise the one or more new versions of the selection of one or more functions at a second address while maintaining the selection of the one or more existing versions of the one or more functions at a first address. The program instructions are executable by a processor to cause the processor to selectively transfer control from the selection of one or more existing versions of the one or more functions to the one or more new versions at the second address for only a selection of one or more processes that call the selection of one or more existing versions of the one or more functions from among a plurality of processes of the application, the selection of one or more processes each comprising one or more attributes matching the at least one selection criteria.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 illustrates one example of block diagram of selectively applying a hotpatch to only a selection of processes of a running instance of an application according to selection criteria;

FIG. 2 illustrates one example of a block diagram of one or more types of selection criteria, such as static selections and dynamic selections, that may be applied when selectively applying a hotpatch to only a selection of processes of a running instance of an application according to the selection criteria;

DETAILED DESCRIPTION

Figure 3:
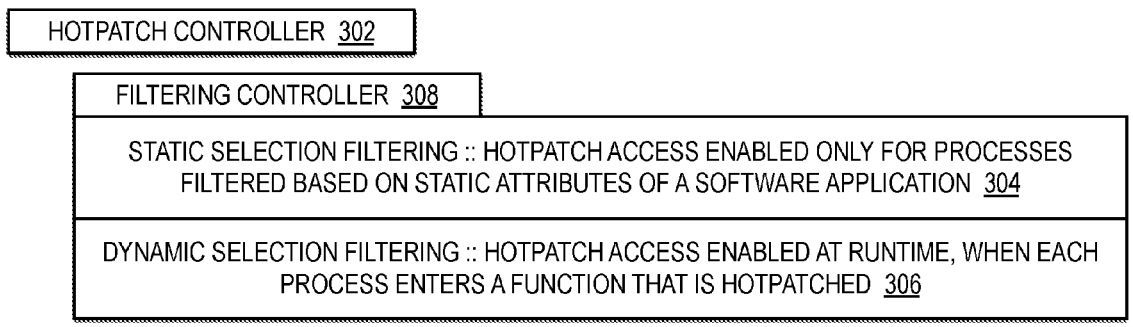
FIG. 3 illustrates one example of a block diagram of a hotpatch controller for selectively applying a hotpatch to only a selection of processes of a running instance of an application according to selection criteria.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of selectively applying a hotpatch to only a selection of processes of a running instance of an application according to selection criteria.

In one example, a released version of an application, such as a software product, may require updates to fix bugs or errors or add new features to the already released version of an application running on a client system. In one example, an update to an application may be applied to an application that also requires a system kernel to be rebooted or the application to be restarted. Rebooting a system kernel or restarting an application lead to downtimes in the availability of a software product from a client system. Alternatively, updates to applications may be provided that allow for hotpatching updates to an application on a client system, where hotpatching applies updates to a running instance of the application on the client system, without requiring rebooting the system kernel or restarting the application.

One element of hotpatching may require transferring control of the execution flow of processes of the application from an old function to a new function, in the update. When multiple processes share a same function of an application and the function is updated by a patch, the new, patched function applies to all the processes using the function, however, in a multiuser environment, there is a need to enable control hotpatching on a process by process basis, based on one or more attributes of each process.

In one example, a user selects to apply a hotpatch 110 to a running instance of software 120. In one example, hotpatch 110 may include one or more updates, such as update 112, which may represent code or data that may be applied to running instance of software 120, without requiring running instance of software 120 to be restarted or a system to be rebooted.

In one example, running instance of software 120 may include one or more processes, such as, but not limited to, process 130, process 132, and process 134. In one example, as described herein, in addition to or as an alternative to processes, running instance of software 120 may also run one or more threads, where functions described with reference to processes, herein, may also apply to threads or other executable elements of running instance of software 120. In one example, running instance of software 120 may refer to an application that is running. In addition, in additional examples, running instance of software 120 may refer to software running at additional or alternate layers, including, but not limited to, an operating system layer, a network layer, and a firmware layer. In addition, running instance of software 120, or a running instance of an application, may refer to a software system that includes one or more applications.

In one example, update 112 of hotpatch 110 may be applied to running instance of software 120 according to selection criteria 114, such that the hotpatching is only effective to one or more processes from among process 130, process 132, and process 134 with attributes that match selection criteria 114. In one example, selection criteria 114 may include any single attribute or combination of attributes assignable to a process, which may include, but is not limited to, one or more of a user ID, thread ID, system state, patch classification, date/time, system runtime, and user defined criteria.

In one example, running instance of software 120 may be running with one or more functions, such as a function 122. In one example, running instance of software 120 may include an existing version 126 for function 122, prior to hotpatch 110 being applied and after hotpatch 110 is applied. When hotpatch 110 is applied, function 122 is updated to also include an updated version 124 after applying update 112. In another example, function 122 may not include an existing version 126 and function 122 may be newly added to running instance of software 120 by hotpatch 110.

In one example, prior to the application of hotpatch 110, as to function 122, all of process 130, process 132, and process 134 may see existing version 126, if present, or not see function 122 at all, if function 122 is newly added by hotpatch 110. In one example, when update 112 is applied to running instance of software 120, function 122 may be updated. In one example, updated version 124 may represent existing version 126 as patched with update 112. In another example, updated version 124 may represent existing version 126, replaced by update 112. In another example, updated version 124 may represent a new function entirely, where there is no existing version of function 122 updated by update 112.

In one example, one or more attributes of process 130 and process 132 match selection criteria 114, as illustrated at reference numeral 136, but none of the attributes of process 134 match selection criteria 114. In one example, because one or more attributes of process 130 and process 132 match selection criteria 114, updated version 124, which is made available within running instance of software 120 based on hotpatch 110, is only visible to process 130 and process 132. In one example, where function 122 includes existing version 126, even after hotpatch 110 is applied, process 134 continues to only view existing version 126 for function 122.

In the example, although hotpatch update 112 is applied to function 122 and therefore applies to all processes that access function 122, the selection of processes permitted to see the updated version 124 for function 122 are dynamically selected based on selection criteria 114. In the example, because only process 130 and process 132 can see updated version 124, hotpatch 110 only triggers changes to the execution flows of process 130 and process 132, without changing the execution flow of process 134. In one example, selection criteria 114 may also be dynamically specified such that processes that are allowed to view updated version 124 during a first iteration, such as process 130 and process 132, may be switched based on selection criteria 114 to view existing version 126 on a next iteration.

In one example, by controlling hotpatching to selectively change the control flow of only a selection of processes by a hotpatch, selection criteria 114 may specify one or more particular user IDs, where each process includes a user ID specifying the subscriber ID of the user accessing running instance of software 120. In one example, running instance of software 120 may represent Software as a Service, delivered by a hosted service in a cloud computing environment, where each user subscribes to the Software as a Service and pays for a particular level of service as part of the subscription. In one example, update 112 may provide updated version 124 that boosts the performance of running instance of software 120. When applying hotpatch 110, the hosted service of running instance of software 120 may specify selection criteria 114 with the user IDs of those users with subscription services starting at a particular level of service, such that only those processes initiated for subscribers with a particular level of service or higher will view updated version 124 and receive the boosted performance.

In one example, by controlling hotpatching to selectively change the control flow of only a selection of processes by a hotpatch, when a security vulnerability is identified only when a process is run with one or more particular user IDs, selection criteria 114 may be specified with the one or more particular user IDs and update 112 may provide a security update for function 122 for access by processes with the one or more particular user IDs. By specifying selection criteria 114 for only those user IDs that appear to be vulnerable to security issues, other processes are not impacted by the hotpatch and can continue to function normally. In addition, by specifying selection criteria 114 by an attribute of a process, if the same security vulnerability is also associated with other process attributes, a same update could be applied to different processes based on user ID and the other process attributes identified.

FIG. 2 illustrates a block diagram of one example of one or more types of selection criteria, such as static selections and dynamic selections, that may be applied when selectively applying a hotpatch to only a selection of processes of a running instance of an application according to the selection criteria.

In one example, selection criteria types 202 may include one or more types of selection attributes that may be specified in selection criteria for a hotpatch, such as in selection criteria 114 of hotpatch 110. In one example, within selection criteria types 202, each type of selection criteria may be further classified according to whether the selection criteria is to be applied based on static selection 210, and may include one or more attributes that are dynamic, illustrated as dynamic selection 220.

In one example, examples of static attributes illustrated as static selection 210 may include attributes including, but not limited to, process identifiers 212, owner of the process 214, and classification of hotpatch 216. In one example, process identifiers 212 may include one or types of identifiers for one or more types of processes, including threads, including, but not limited to, process name, process ID, and process group ID. In one example, owner of process 214 may include one or more types of identifiers based on use of the process including, but not limited to, user ID of the process and group ID of the process. In one example, classification of the hotpatch 216 may include one or more types of identifiers based on the type of hotpatch including, but not limited to, security and performance.

In one example, examples of dynamic attributes illustrated as dynamic selection 220 may include attributes including, but not limited to, static selections 222, date/time 224, program context of the process 226, and user-defined handler for filtering 228. In one example static selections 222 may include one or more of the selections designated also under static selection 210. In one example, date/time 224 may include one or more types of time identifiers, including, but not limited to, a date, a time, and a time range. In one example, program context of the process 226 may include one or more types of identifiers including, but not limited to values of a global variable, a local variable, and function parameters. User defined handler for filtering 228 may include any user defined handler specified for filtering.

In an additional or alternate embodiment, selection criteria 202 may include additional or alternate types of attributes and additional or alternate classifications of attributes.

FIG. 3 illustrates a block diagram of one example of a hotpatch controller for selectively applying a hotpatch to only a selection of processes of a running instance of an application according to selection criteria.

In one example, a hotpatch controller 302 is a component that controls or directs the application of a hotpatch to a running instance of software, such as application of hotpatch 110 to running instance of software 120. In one example, hotpatch controller 302 may represent code that directs performance of a processor to apply a hotpatch to a running instance of software. In one example, hotpatch controller 302 may be implemented within one or more system layers including, but not limited to, a kernel or operating system layer and an application layer.

In one example, hotpatch controller 302 may include a filtering controller 308 that controls selectively filter the processes that are allowed to see a hotpatch update, according to selection criteria 114 for hotpatch 110, depending on the classification of selection criteria for the hotpatch as static selection 210 or as dynamic selection 220.

In one example, hotpatch controller 302 may apply static selection filtering 304 of filtering controller 308 when selection criteria 114 include one or more attributes from static selection 210. In one example, through the application of static selection filtering 304, hotpatch controller 302 may apply hotpatch 110 to running instance of software 120, at one time, such that only a selection of processes are enabled to view updated version 124 based on static attributes of a program. In the example, through the application of static selection filtering 304, a process without attributes that match one or more attributes from static selection 210, such as process 136, is not even aware that a hotpatch has been applied to function 122 when the process executes with function 122. In addition, in the example, for processes that are selected according to selection criteria 114, there is not any additional overhead required by static selection filtering 304 to enable the selected processes to view updated version 124, even though multiple processes may share the same area for function 122.

In one example, hotpatch controller 302 may apply dynamic selection filtering 306 of filtering controller 308 when selection criteria 114 include one or more attributes from dynamic selection 220. In one example, through the application of dynamic selection filtering 306, hotpatch controller 302 may apply hotpatch 110 at runtime, such that a decision about whether a process is allowed to view updated version 124 is made at runtime, when the process enters function 122, which has been hotpatched. In the example, the application of dynamic selection filtering 306 to processes at runtime may require additional overhead for filtering because each process of a program that share function 122 would be filtered when each process executes. In comparison, when static selection filter 304 is applied, there may not be any filtering overhead when processes execute for processes that do not have attributes matching static selection 210.

In additional and alternate embodiments, additional or alternate types of selection criteria may be implemented. In addition, in additional or alternate embodiments, each type of selection criteria may be implemented in additional or alternate ways.

Figure 4:
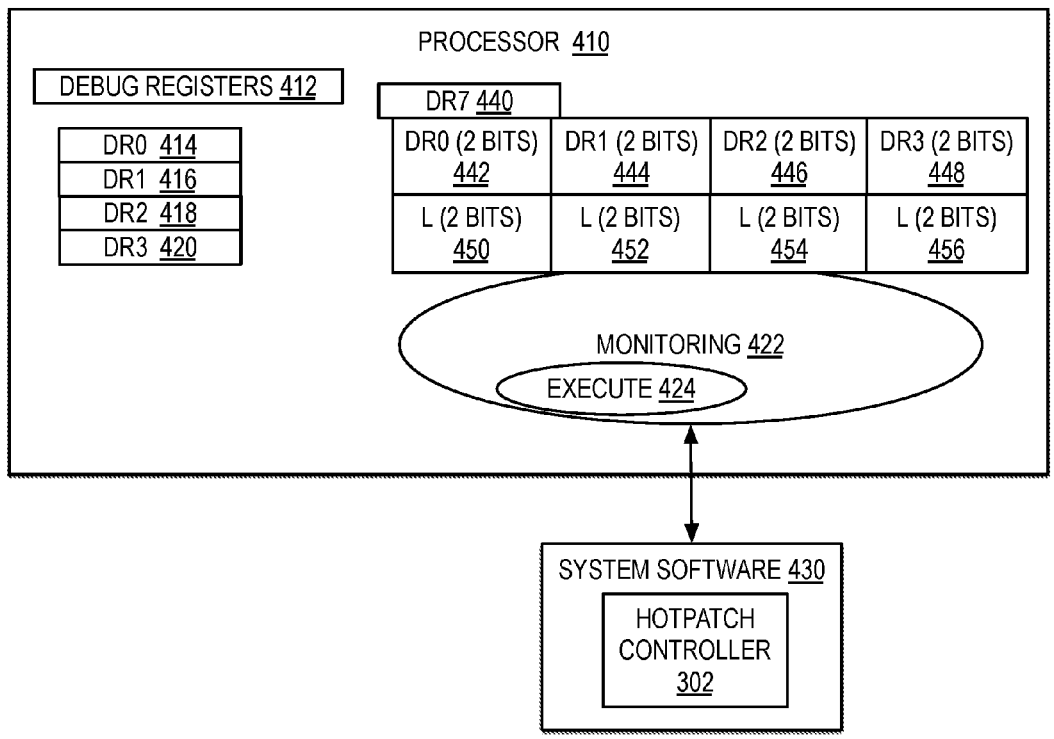
FIG. 4 illustrates one example of a block diagram of a hotpatch controller for selectively applying a hotpatch to only a selection of processes of a running instance of an application according to selection criteria by setting an exception in a processor to trigger the hotpatching.

FIG. 4 illustrates a block diagram of one example of a hotpatch controller for selectively applying a hotpatch to only a selection of processes of a running instance of an application according to selection criteria by setting an exception in a processor to trigger the hotpatching.

In one example, a processor 410 illustrates one example of a processor that may include one or more monitoring options, such as monitoring 422, where monitoring 422 of processor 410 may monitor a specific memory address set in one or more registers, such as in debug registers 412. In one example, debug registers 412 may include one or more individual registers, illustrated in the example as D0 414, D1 416, D2 418, and D3 420, which may be loaded with specific memory addresses.

In one example, monitoring 422 may be selectively set to monitor a specific memory address in one of debug registers 412 for events and if a selected event occurs at the specific memory address, monitoring 422 generates an exception. In one example, when monitoring 422 generates an exception, system software 430 is given control of the execution. In one example, system software 430 may include a kernel, where the kernel may include an exception handler that detects the exception and handles the exception. In one example, the exception handler may be modified to allow for handling an exception, where the kernel may return control to the processor to continue handling a process using an existing version of a function at an original address or using an updated version of a function at a new address passed to the processor.

In one example, monitoring 422 may be selectively set to monitor an address in a particular register from among debug registers 412 based on a setting within a particular register. In one example, debug registers 412 may also include a register DR7 440, where a first 2 bits 442 are assigned for setting a monitoring mode for DR0 414, a next 2 bits 444 are assigned for setting a monitoring mode for DR1 416, a next 2 bits 446 are assigned for setting a monitoring mode for DR2 418, and a last 2 bits 448 are assigned for setting a monitoring mode for DR3 420. In one example, each two bit setting within register DR7 440 may selectively designate a particular mode by which monitoring 422 should monitor the address in the register associated with the two bit setting.

In one example, modes of monitoring by monitoring 422 may include, but are not limited to, an "execute" mode 424 of monitoring instruction execution of the function at the address in an associated register with a two bit setting of "00", a "write" mode of monitoring for data writes to the address in an associated register with a two bit setting of "01", an "any I/O read or write" mode for monitoring for any I/O initiated read or write to the address in an associated register with a two bit setting of "10", and a "read or write but not instruction fetch" mode for monitoring for any read or write, but not instruction fetch, to the address in an associated register with a two bit setting of "11".

In addition, in one example, for each monitoring bit setting within register D7 440, an additional two bits, labeled as "L", may be set in association with each register, for specifying the length of a memory area to watch for from the address each associated register. For example, a first two bits L 450 are assigned for setting a length of a memory area from the address in DR0 414, a second two bits L 452 are assigned for setting a length of a memory area from the address in DR1 416, a next two bits L 454 are assigned for setting a length of a memory area from the address in DR2 418, and a last two bits L 456 are assigned for setting a length of a memory area from the address in DR3 420. In one example, a two bit setting of "00" may specify 1 byte, a two bit setting of "01" may specify 2 bytes, a two bit setting of "10" may specify 8 bytes, and a two bit setting of "11" may specify 4 bytes.

In one example, execute mode 424 is one example of a mode that may be utilized by hotpatch controller 302 when controlling a hotpatch that is only visible to a selection of processes according to selection criteria. In one example, execute mode 424 triggers an exception when the CPU tries to execute the instruction from the memory address set in the associated debug register.

In one example, system software 430 may include hotpatch controller 302. In one example, hotpatch controller 302 may perform static selection filtering 304 by only directing processor 410 to set a watchpoint in execute mode 424 at the first instruction of an existing version of a function when scheduling only those processes that are allowed to view an updated version of the function according to static selections of the selection criteria, such that for any process that is not allowed to view the updated version of the function according to static selections of the selection criteria, there is no additional overhead because no watchpoint is set for any of the processes that are not allowed to view the updated version. In the example, the exception handler may be modified to allow for handling the exception, where for static selection filtering 304, the kernel may return control to the processor to continue handling a process using an updated version of a function at a new address passed to the processor.

In one example, hotpatch controller 302 may perform dynamic selection filtering 306 by setting a watchpoint in execute mode 424 at the first instruction of an existing version of a function when scheduling any process that accesses the function. By setting a watchpoint in execute mode 424 for any processes that accesses the function, there is an overhead for setting the watchpoint for all processes that access the function. When system software 430 receives control from processor 410 from an exception, hotpatch controller 302 performs dynamic selection filtering 306 by determining whether the process requesting access to the function with a hotpatch is allowed to view the updated function from the hotpatch, based on the dynamic selections of the selection criteria for the hotpatch. In one example, the exception handler may be modified to allow for handling the exception, where for dynamic selection filtering 306, the kernel may return control to the processor to continue handling a process using an existing version of a function at an original address, if the process is not allowed to view the updated function, or using an updated version of a function at a new address passed to the processor, if the process is allowed to view the updated function.

In one example, by selectively setting watchpoints for those functions which are updated by a hotpatch, while a function is updated to include an updated function from a hotpatch, only those processes that are allowed to view the updated function for a hotpatch according to selection criteria actually view the updated function. In contrast, other methods of hotpatching may provide for applying a hotpatch to a particular process by patching an executable function using a hotpatching function that inserts a branch instruction to an updated function at the beginning of an existing function, which is pervasive to all processes. In one example, inserting a branch instruction to an updated function at the beginning of an existing function results in all processes that call the existing function being redirected to the updated function through the branch instructions. In another example, other methods of hotpatching may provide for hotpatching during a debugging session by adding a hardware breakpoint set with a thread ID, such as a GDB breakpoint, however, even if a GDB breakpoint uses a thread ID to make a breakpoint act as if the breakpoint is thread-specific, the effect of a GDB breakpoint is still pervasive to all processes will view the updated function after the first access by a process to the updated function. In one embodiment of the present invention, however, an updated function from a hotpatch as performed by hotpatch controller 302 is not pervasive as to all processes that view the existing function. In one embodiment of the present invention, only those processes that are allowed by the selection criteria of a hotpatch are allowed to view an updated function from a hotpatch to an existing function as performed by hotpatch controller 302. In one embodiment of the present invention, hotpatch controller 302 applies hotpatching updates to processes at times dependent upon whether the selection criteria includes static selections only or also includes dynamic selections and does not require manual relocations. In one embodiment of the present invention, hotpatch controller 302 may include all the instructions for automatically modifying a kernel exception handler within system software 430 and for automatically directing the kernel to set watchpoints for processes, such that no additional manual intervention is required for hotpatch controller 302 to selectively apply hotpatches to only a selection of processes.

In addition, in one example, by hotpatch controller 302 selectively setting watchpoints for those functions which are updated by a hotpatch, while a function is updated to include an updated function from a hotpatch, only those processes that are allowed to view the updated function for a hotpatch according to selection criteria actually view the updated function. In contrast, other methods of hotpatching may provide for applying a hotpatch to a particular process by using a hotpatch plug-in, such as dlopen( ) or LD_PRELOAD. One limitation of a hotpatch plugin such as dlopen( ) or LD_PRELOAD may be that these plugins may only apply to application or library code only and cannot apply at the kernel code level of system software 430, however, hotpatching according to the present invention may apply at the kernel code level of system software 430. In one example, because plugins such as dlopen( ) or LD_PRELOAD may only apply at the application level, applications may be coded with conditions that call the plugins and these conditions are selected at the time when the application is developed, however, hotpatching by hotpatch controller 302 according to the present invention can apply to any application, with the kernel selecting which applications should be selected for hotpatching and dynamically selecting which processes a hotpatch should apply to when the hotpatch is received, without requiring the applications to be precoded to call a plugin and without requiring conditions for selecting which processes a hotpatch applies to be limited to the conditions coded in a plugin at the time the application is developed. Another limitation of dlopen( ) is that dlopen( ) is restricted in the scope of attributes to which it applies and cannot be selected based on user ID, user credentials, or other system parameters not available to the user. Another limitation of dlopen( ) is that dlopen is limited to hotpatching library code, while hotpatch controller 302 allows for hotpatching main executable functions, library code, and other code of any running application. Another limitation of a plug-in such as LD_PRELOAD is that this plugin requires restarting an application with LD_PRELOAD pointing to an updated library, which defeats the purpose of having hotpatched while a software application is running.

Figure 5:
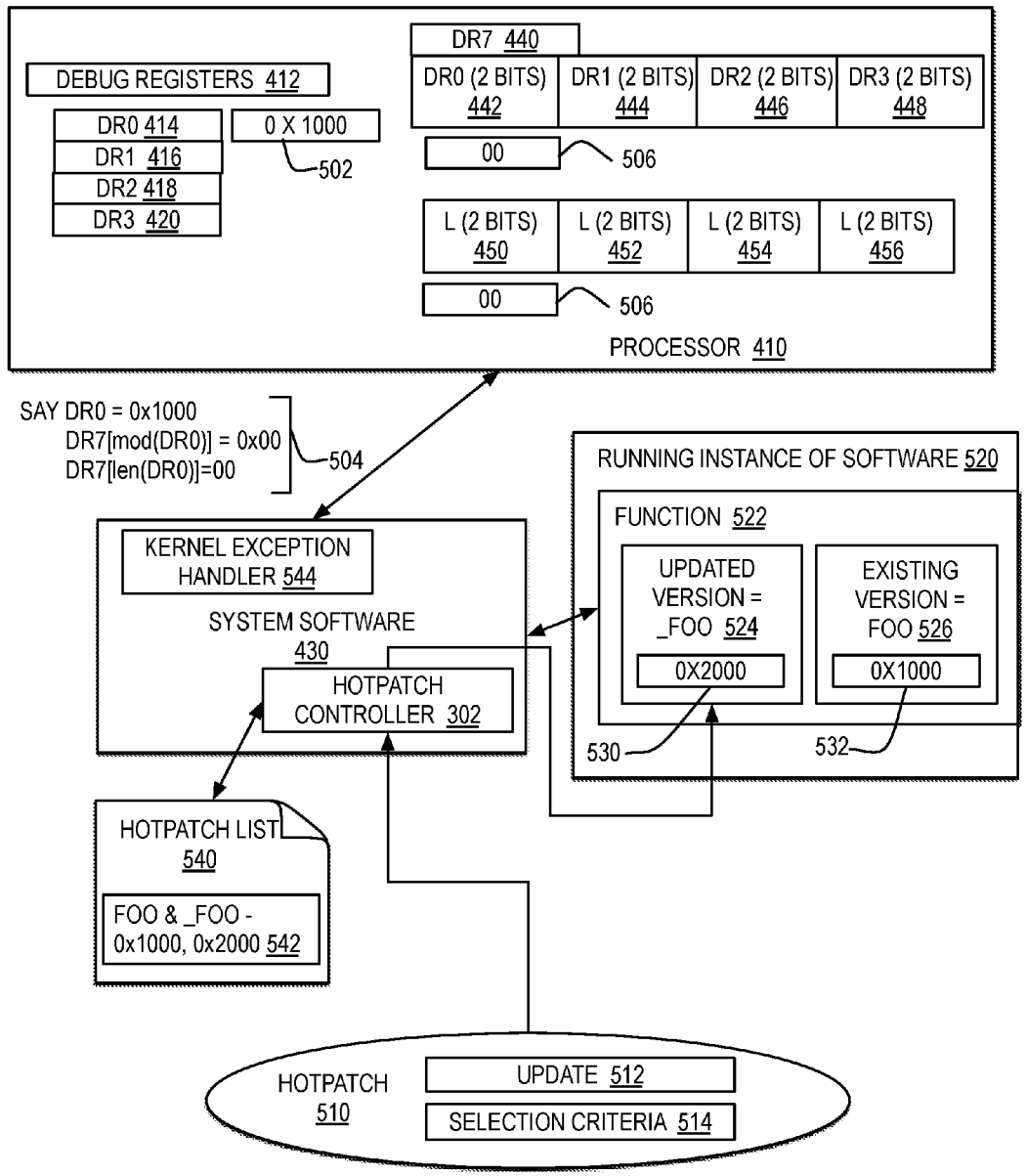
FIG. 5 illustrates one example of a block diagram of a hotpatch controller selectively applying a hotpatch to only a selection of processes of a running instance of an application according to selection criteria by setting an exception in a processor to trigger the hotpatching.

FIG. 5 illustrates a block diagram of one example of a hotpatch controller selectively applying a hotpatch to only a selection of processes of a running instance of an application according to selection criteria by setting an exception in a processor to trigger the hotpatching.

In one example, a function 522 of a running instance of software 520 originally includes a function 522, where function 522 includes an existing version 526 labeled "FOO" and located at an address 0x1000, as illustrated at reference numeral 532. In one example, a hotpatch 510 is detected by hotpatch controller 302, including an update 512 and selection criteria 514. In one example, hotpatch controller 302 controls updates to function 522 with an updated version 524 labeled "FOO", from update 512, which is located at an address 0x2000, as illustrated at reference numeral 530.

In one example, hotpatch controller 302 may request to set a watchpoint in processor 410 to generate an exception when a process requests access to existing version 526 located at an address 0x1000 and hotpatch controller 302 may modify a kernel exception handler 544 to receive control from processor 410 when an exception is generated and to determine whether to return control to processor 410 with an address of updated version 524 of 0x2000 or to the previous request of existing version 526 at 0x1000. In one example, hotpatch controller 302 may interface with processor 410 through one or more layers of system software 430 which may include, but are not limited to, application layers, kernel layers, firmware layers, and other layers. In one example, hotpatch controller 302 may request to set the watchpoint when a process is scheduled within processor 410, before the process begins execution. In one example, if selection criteria 514 includes static selections only, hotpatch controller 302 may request to set the watchpoint in processor 410 only when a process that is included in the selection of processes allowed to view updated version 524, according to selection criteria 514, is scheduled in processor 410. By setting a watchpoint in processor 410 only for those processes allowed to view updated version 524, there is no overhead required for the other processes that are not allowed to view updated version 524. In another example, if selection criteria 514 includes dynamic selections, hotpatch controller 302 may request to set the watchpoint in processor 410 for any process that is scheduled to request access to function 522, such that hotpatch controller 302 may determine, at time of processor execution, whether a process is allowed to view updated version 524 of function 522 according to the dynamic criteria within selection criteria 514. In additional or alternate embodiments, hotpatch controller 302 may request the watchpoint in processor 410 at additional or alternate times and in response to additional or alternate events.

In one example, system software 430 may convert a request by hotpatch controller 302 to set an exception when a process requests access to existing version 526 as a machine level set of instructions for setting debug registers 412 within processor 410, such as instructions 504. In another example, hotpatch controller 302 may generate instructions 504. In one example, as illustrated in instructions 504, a first instruction of "DR0=0x1000" sets DR0 414 with the address "0x1000", which is the address of existing version 526. In one example, as illustrated in instructions 504, a second instruction of "DR7[mod(DR0)]=0x00" sets DR0 (2 BITS) 442 to "00" and a third instruction of "DR7[len(DR0)]=00" sets L (2 BITS) 450 to "00". The DR0 (2 BITS) 442 setting of "00" sets an execute mode of monitoring for exceptions for DR0 414 and the L (2 BITS) 450 setting of "00" sets an length of the address area to monitor of 1 byte from the address set in DR0 414.

In one example, in addition to sending the request to set a watchpoint in processor 410, hotpatch controller 302 may add an entry for the hotpatch in hotpatch list 540. In one example, hotpatch controller 302 adds an entry for the hotpatch in hotpatch list 540 by adding a pairing entry 542 that includes a pair of function calls for existing version 526 of "FOO" and for updated version 524 of "_FOO" and the corresponding starting address of each function of "0x1000" for "FOO" and "0x2000" for "_FOO".

In one example, when processor 410 receives a request by a process for execute function 522 at address "0x1000", because DR0 (2 BITS) 442 is set in execute mode, to trigger an exception if an execute request is received for "0x1000". In one example, when the exception is triggered, processor 410 hands over control to a kernel of system software 430 and passes address "0x1000" that triggered the exception. In one example, if selection criteria 514 include dynamic selections, hotpatch controller 302 determines whether the process requesting function 522 is allowed to view updated version 524 based on selection criteria 514. If the process is not allowed to view updated version 524, system software 430 returns control to processor 410, and the requesting process continues to view existing version 526. In one example, for system software 430 to return control to processor 410 with the process continuing to view existing version 526, hotpatch controller 302 may direct kernel exception handler 544 to return control to processor 410 to continue functioning based on the previous request to execute existing version 526.

In one example, if the process requesting function 522 is a process allowed to view updated version 524 according to selection criteria 514, whether according to static selections or dynamic selections, hotpatch controller 302 searches for address "0x1000" in hotpatch list 540 and finds a match in pairing 542. In another example, if processor 410 does not pass the address to system software 430 with the exception, system software 430 may determine the label for the function executing, of "FOO", and search hotpatch list 540 using the label for the function, also finding a match in pairing 542. In one example, hotpatch controller 302 determines, based on pairing 542, a new address of updated version 524 of "0x2000" and system software 430 returns control to processor 410 with a direction to access updated version 524 at "0x2000". In one example, for system software 430 to return control to processor 410 with a direction to access updated version 524 at "0x2000", hotpatch controller 302 may modify kernel exception handler 544 to direct kernel exception handler 544 to return control to processor 410 directed to updated version 524.

Figure 6:
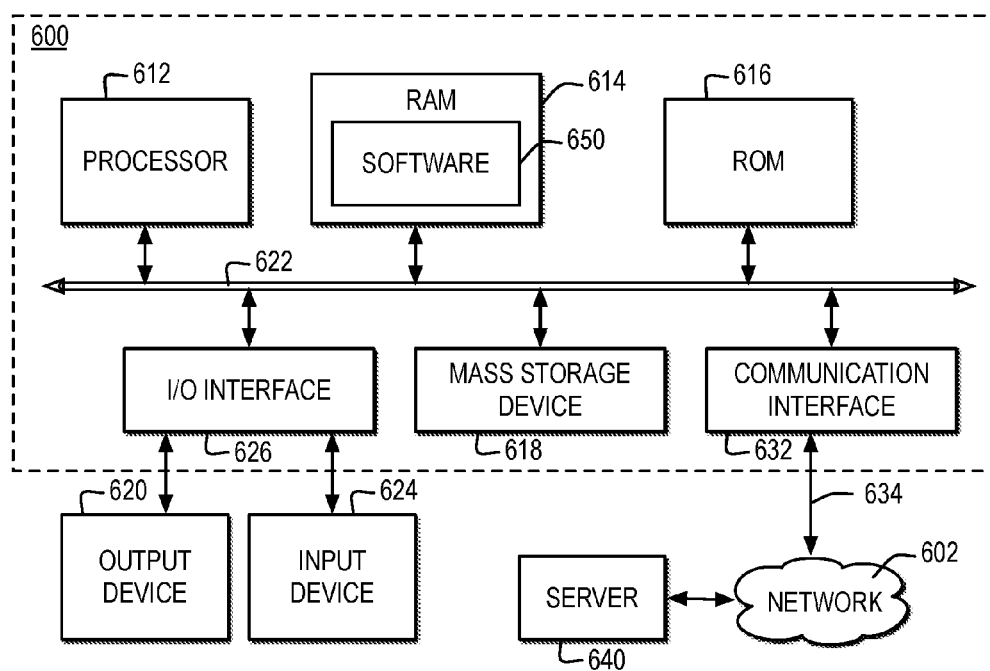
FIG. 6 illustrates one example of a block diagram of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment. In one example, RAM 614 or ROM 616 may represent external memory devices to an SOC within computer system 600, such RAM 616 or ROM 616 representing external memory devices 124. In another example, computer system 600 may represent a SOC, where computer system 600 then connects to external memory, such as external memory devices 124, through a shared physical memory channel of computer system 600.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 may control the operations of flowchart of FIGS. 7-10 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 7-10.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

Figure 7:
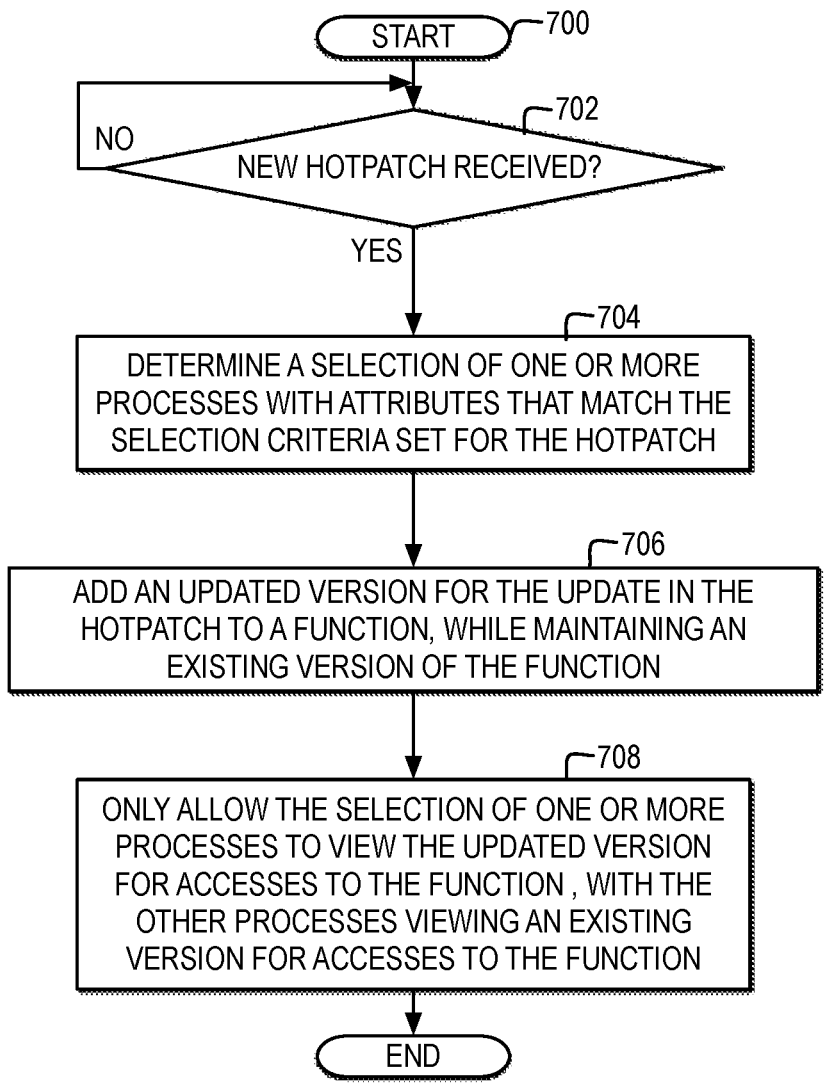
FIG. 7 illustrates a high level logic flowchart of a process and computer program product for selectively applying a hotpatch to only a selection of processes of a running instance of an application according to selection criteria.

FIG. 7 illustrates a high level logic flowchart of a process and computer program product for selectively applying a hotpatch to only a selection of processes of a running instance of an application according to selection criteria.

In one example, the process and program begin at block 700 and thereafter proceed to block 702. Block 702 illustrates a determination whether a new hotpatch is received. At block 702, if a new hotpatch is received, then the process passes to block 704. Block 704 illustrates determining a selection of one or more processes with attributes that match the selection criteria for the hotpatch. Next, block 706 illustrates adding an updated version for the update in the hotpatch to a function while maintaining an existing version of the function. Thereafter, block 708 illustrates only allowing the selection of one or more processes to view the updated version for accesses to the function, with the other processes viewing the existing version for accesses to the function, and the process ends.

Figure 8:
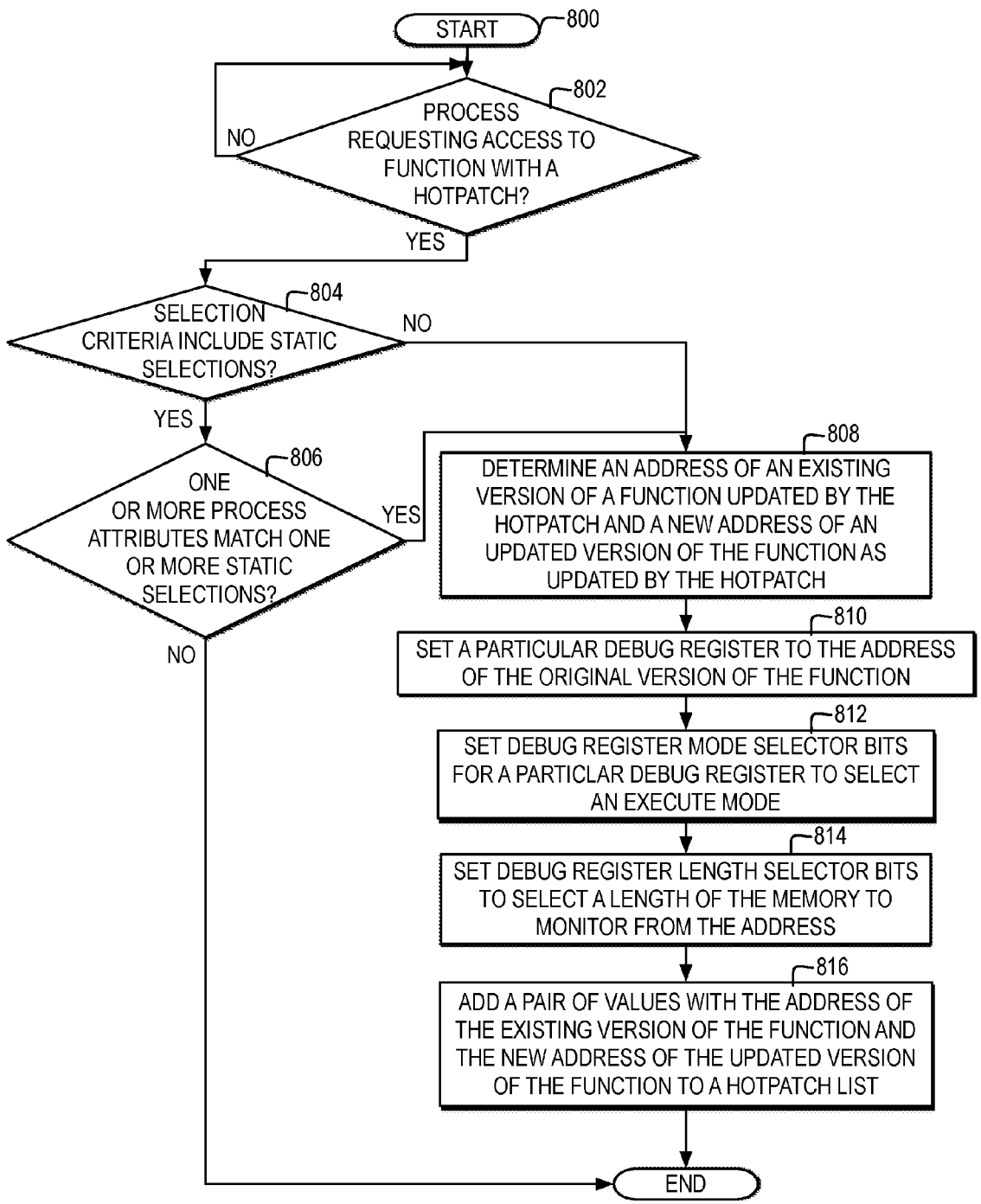
FIG. 8 illustrates a high level logic flowchart of a process and computer program product for selectively applying a hotpatch to only a selection of processes of a running instance of an application according to selection criteria by setting an exception in a processor to trigger the hotpatching and maintaining hotpatch pair list.

FIG. 8 illustrates a high level logic flowchart of a process and computer program product for selectively applying a hotpatch to only a selection of processes a running instance of an application according to selection criteria by setting an exception in a processor to trigger the hotpatching and maintaining hotpatch pair list.

In one example, the process and program begin at block 800 and thereafter proceed to block 802. Block 802 illustrates a determination whether a process is requesting access to a function with a hotpatch. At block 802, if a process is requesting access to a function with a hotpatch, then the process passes to block 804. Block 804 illustrates a determination whether the selection criteria for the hotpatch include static selections. At block 804, if the selection criteria for the hotpatch include static selections, then the process passes to block 806. Block 806 illustrates a determination whether one or more process attributes match one or more static selections within the selection criteria. At block 806, if one or more process attributes do not match one or more static selections within the selection criteria, then the process ends. At block 806, if one or more process attributes do match one or more static selections within the selection criteria, then the process passes to block 808.

Returning to block 804, if the selection criteria do not include static selections, then the process passes to block 808. Block 808 illustrates determining an address of an existing version for a function updated by the hotpatch and an a new address of an updated version for the function as updated by the hotpatch. Next, block 810 illustrates setting a particular debug register to the address of the existing version of the function. Thereafter, block 812 illustrates setting debug register mode selector bits for a particular debug register to select an execute mode. Next, block 814 illustrates setting debug register length selector bits to select a length of the memory to monitor from the address. Thereafter, block 816 illustrates adding a pair of values with the address of the existing version of a function and the new address of the updated version of the function to a hotpatch list, and the process ends.

Figure 9:
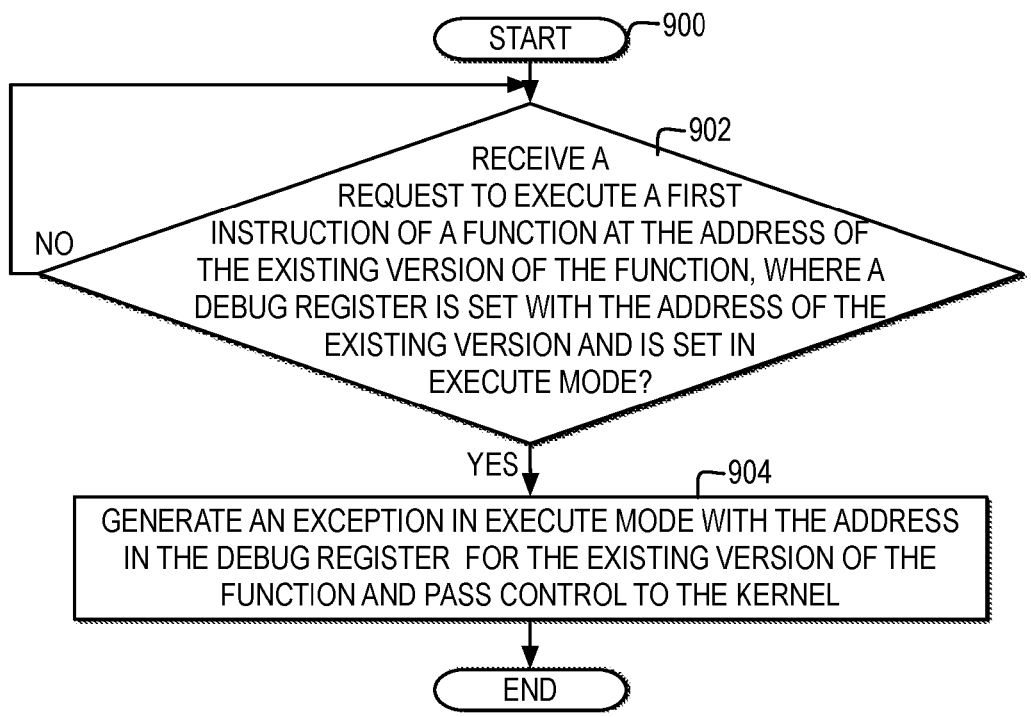
FIG. 9 illustrates a high level logic flowchart of a process and computer program product for selectively applying a hotpatch to only a selection of processes of a running instance of an application according to selection criteria by generating an exception and passing control to the kernel.

FIG. 9 illustrates a high level logic flowchart of a process and computer program product for selectively applying a hotpatch to only a selection of processes of a running instance of an application according to selection criteria by generating an exception and passing control to the kernel.

In one example, the process and program begin at block 900 and thereafter proceed to block 902. Block 902 illustrates a determination whether a process receives a request to execute a first instruction of a function at the address of the existing version is received, where a debug register is set with the address of the existing version of the function and is set in execute mode. At block 902, if a request to execute a first instruction at the address of the existing version of the function is received, then the process passes to block 904. Block 904 illustrates the processor generating an exception in execute mode with the address in the debug register for the existing version of the function and passing control to the kernel, and the process ends.

Figure 10:
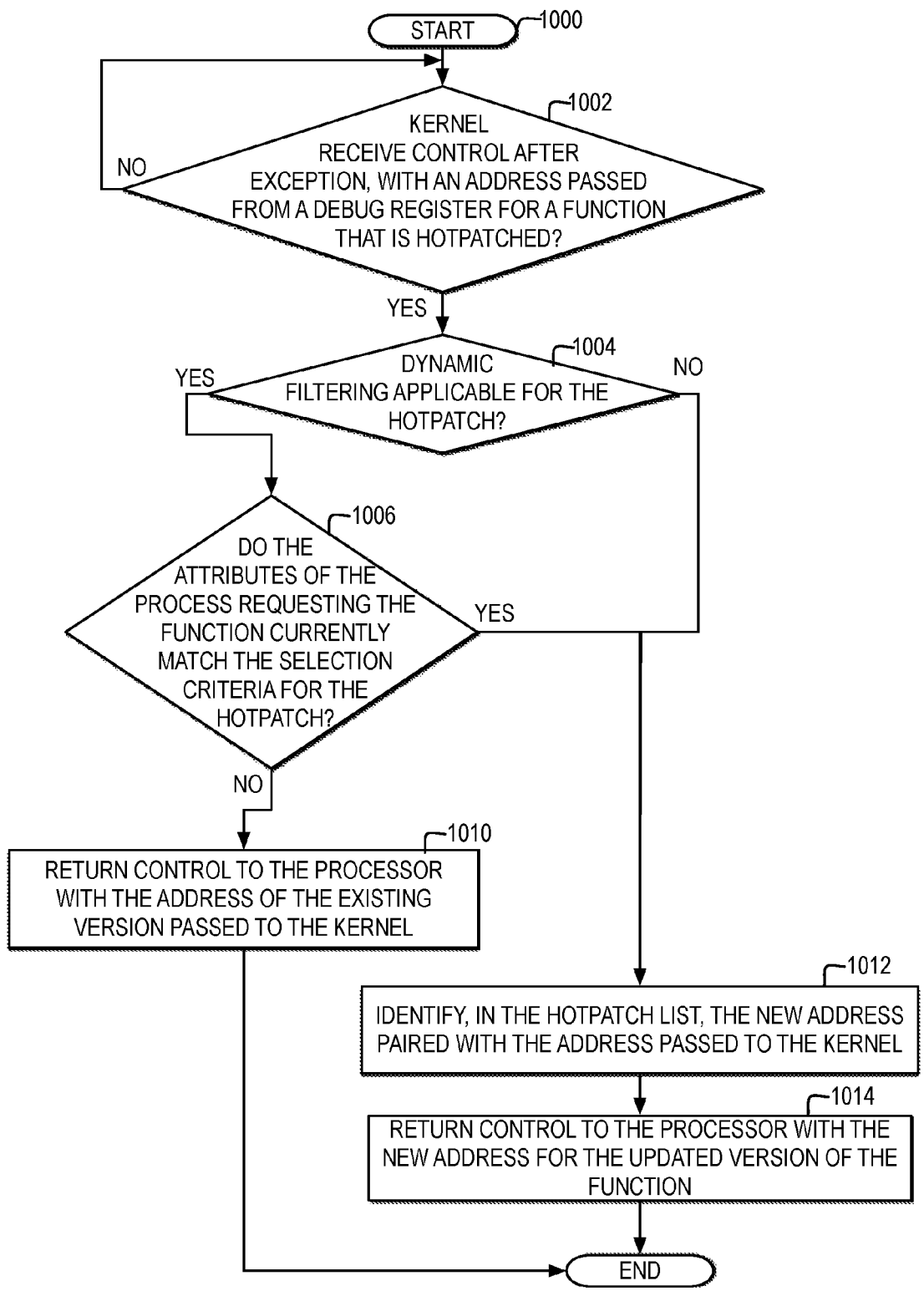
FIG. 10 illustrates a high level logic flowchart of a process and computer program product for selectively applying a hotpatch to only a selection of processes of a running instance of an application according to selection criteria by determining whether to allow a process to view an updated version of a function from a hotpatch at a new address in a hotpatch list matching an address passed by a processor with an exception.

FIG. 10 illustrates a high level logic flowchart of a process and computer program product for selectively applying a hotpatch to only a selection of processes of a running instance of an application according to selection criteria by determining whether to allow a process to view an updated version of a function from a hotpatch at a new address in a hotpatch list matching an address passed by a processor with an exception.

In one example, the process and program begin at block 1000 and thereafter proceed to block 1002. Block 1002 illustrates a determination whether the kernel receives control from an exception, with an address passed by the processor from a debug register for a function that is hotpatched. At block 1002, if the kernel receives control from an exception, with an address passed by the processor from a debug register for a function that is hotpatched, then the process passes to block 1004. Block 1004 illustrates a determination whether dynamic filtering is applicable for the hotpatch. At block 1004, at block 1004, if dynamic filtering is not applicable, then the process passes to block 1012. Otherwise, at block 1004, if dynamic filtering is applicable, then the process passes to block 1006. Block 1006 illustrates a determination whether the attributes of the process requesting the function currently match the selection criteria for the hotpatch. At block 1006, if the attributes of the process requesting the function do not currently match the selection criteria for the hotpatch, then the process passes to block 1010. Block 1010 illustrates returning control to the processor with the address of the existing version of the function passed to the kernel, and the process ends. At block 1006, if the attributes of the process requesting the function do match the selection criteria for the hotpatch, then the process passes to block 1012. Block 1012 illustrates identifying, in the hotpatch list, the new address paired with the address passed to the kernel. Next, block 1014 illustrates returning control to the processor with the new address for the updated version of the function, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for modifying an application during execution of the application, the method comprising:

receiving, using one or more processors, one or more new versions of a selection of one or more functions of a plurality of functions of an application and at least one selection criteria for applying the one or more new versions to the application during execution of the application to update a selection of one or more existing versions of the one or more functions;

updating, using the one or more processors, the selection of one or more functions of the application, while the application is running, to comprise the one or more new versions of the selection of one or more functions at a second address while maintaining the selection of the one or more existing versions of the one or more functions at a first address;

selectively transferring control, using the one or more processors, from the selection of one or more existing versions of the one or more functions to the one or more new versions at the second address for only a selection of one or more processes that call the selection of one or more existing versions of the one or more functions from among a plurality of processes of the application, the selection of one or more processes each comprising one or more attributes matching the at least one selection criteria;

in response to a particular process from among the plurality of processes being scheduled to access a particular existing version from among the selection of one or more existing versions of the one or more functions, directing, by a kernel, the one or more processors to set an execute watchpoint by setting a particular debug register from among at least one debug register with the first n address of a first instruction of the particular existing version and setting the particular debug register to an execute mode, the one or more processors triggering an exception in response to a request to execute the first instruction at the first address;

generating, by the kernel, using the one or more processors, a pairing of the particular existing function and the first address with a particular new version for updating the particular existing version from among the one or more new versions of the selection of the one or more functions and the second address of a first instruction of the particular new version;

adding a particular pair of values of the first address and the second address to a hotpatch list;

in response to receiving control, by the kernel, from the one or more processors, from an exception triggered by a request to execute the first instruction at the first address, identifying in the hotpatch list the second address paired with the first address in the particular pair of values, only if the particular process is from among the selection of one or more processes each comprising one or more attributes matching the at least one selection criteria;

in response to identifying the second address, returning control, by the kernel, to the one or more processors, with a direction to execute the particular new version at the second address; and in response to the particular process not being from among the selection of one or more processes each comprising one or more attributes matching the at least one selection criteria, returning control, by the kernel, to the one or more processors, to allow execution to continue at the first address.

2. The method according to claim 1, further comprising:
only allowing at least one other process that does not comprise one or more attributes matching the at least one selection criteria during a first iteration from among the plurality of processes to continue to access the selection of the one or more existing versions;

switching, using the one or more processors, the at least one other process to access the selection of the one or more new versions during a next iteration, wherein during the next iteration the at least one other process comprises one or more attributes matching the selection criteria; and switching, using the one or more processors, the at least one other process to return to only access the selection of the one or more existing versions during a subsequent iteration, wherein during the subsequent iteration the at least one other process does not comprise one or more attributes matching the selection criteria.

3. The method according to claim 1, wherein receiving, using one or more processors, one or more new versions of a selection of one or more functions of a plurality of functions of an application and at least one selection criteria for applying the one or more new versions to the application during execution of the application to update a selection of one or more existing versions of the one or more functions further comprises:
receiving, using the one or more processors, the at least one selection criteria comprising one or more static criteria that are applied during runtime at the scheduling of the plurality of processes entering the selection of one or more functions to determine whether to set a watchpoint for generating an exception to selectively transfer control to the second address, the one or more static criteria comprising one or more of a process identifier of a particular process from among the plurality of processes, an owner of the particular process, and a classification of the one or more new versions of the one or more functions, wherein the watchpoint is only set for the selection of the one or more processes each comprising one or more attributes matching the at least one selection criteria.

4. The method according to claim 1, wherein receiving, using one or more processors, one or more new versions of a selection of one or more functions of a plurality of functions of an application and at least one selection criteria for applying the one or more new versions to the application during execution of the application to update a selection of one or more existing versions of the one or more functions further comprises:
receiving, using the one or more processors, the at least one selection criteria comprising one or more dynamic criteria that are applied during runtime at the execution the plurality of processes entering the selection of one or more functions, wherein a watchpoint for generating an exception to selectively transfer control to the second address is set at scheduling of each of the plurality of processes and the dynamic criteria is applied after the exception is triggered during execution to determine whether to continue access to the first address or selectively transfer to access at the second address.

5. The method according to claim 1, wherein in response to a particular process from among the plurality of processes being scheduled to access a particular existing version from among the selection of one or more existing versions of the one or more functions, directing, by a kernel, the one or more processors to set an execute watchpoint by setting a particular debug register from among at least one debug register with a first address of a first instruction of the particular existing version and setting the particular debug register to an execute mode, the one or more processors triggering an exception in response to a request to execute the first instruction at the first address further comprises:
determining, by the kernel, using the one or more processors, when the particular process is being scheduled to access a particular existing version, whether the particular process is from among the selection of one or more processes each comprising one or more attributes matching the at least one selection criteria, wherein the at least one selection criteria comprises a static selection that is detectable when the particular process is being scheduled; and only directing, by the kernel, the one or more processors to set the execute watchpoint if at scheduling the particular process is from among the selection of one or more processes, wherein the resource overhead of setting the execute watchpoint is only used for the selection of one or more processes each comprising one or more attributes matching the at least one selection criteria.

6. The method according to claim 1, wherein in response to receiving control, by the kernel, from the one or more processors, from an exception triggered by a request to execute the first instruction at the first address, identifying in the hotpatch list the second address paired with the first address in the particular pair of values, only if the particular process is from among the selection of one or more processes each comprising one or more attributes matching the at least one selection criteria, further comprises:
determining, by the kernel, using the one or more processors, when the particular process is executing whether the particular process is from among the selection of one or more processes each comprising one or more attributes matching the at least one selection criteria, wherein the at least one selection criteria comprises a dynamic selection that is detectable when the particular process is executing.

7. The method according to claim 1, wherein in response to a particular process from among the plurality of processes being scheduled to access a particular existing version from among the selection of one or more existing versions of the one or more functions, directing, by a kernel, the one or more processors to set an execute watchpoint by setting a particular debug register from among at least one debug register with an address of a first instruction of the particular existing version and setting the particular debug register to an execute mode, the one or more processors triggering an exception in response to a request to execute the first instruction at the address further comprises:

directing, by the kernel, the one or more processors to set the execute watchpoint by setting the particular debug register from among the at least one debug register with the first address of the first instruction of the particular existing version, setting the particular debug register to the execute mode from among a plurality of modes comprising the execute mode of monitoring instruction execution of the function at the address in the particular debug register, a write mode of monitoring for data writes to the address in the particular debug register, an any input/output read or write mode for monitoring for any input/output initiated read or write to the address in the particular debug register, and a read or write but not instruction fetch for monitoring for a read or write but not an instruction fetch to the address in the particular debug register, and setting a length of data following the address of the first instruction, the one or more processors triggering the exception in response to the request to execute an instruction within the memory space of the first instruction at the address with the length of data.

8. The method according to claim 1, wherein returning control, by the kernel, to the one or more processors, with a direction to execute the particular new version at the second address further comprises:

modifying a kernel exception handler of the kernel to return control to the one or more processes to execute the particular new version at the second address.

9. A system for modifying an application during execution of the application, comprising:

a processor, coupled with a memory, and configured to perform the actions of:

receiving one or more new versions of a selection of one or more functions of a plurality of functions of an application and at least one selection criteria for applying the one or more new versions to the application during execution of the application to update a selection of one or more existing versions of the one or more functions;

updating the selection of one or more functions of the application, while the application is running, to comprise the one or more new versions of the selection of one or more functions at a second address while maintaining the selection of the one or more existing versions of the one or more functions at a first address;

selectively transferring control from the selection of one or more existing versions of the one or more functions to the one or more new versions at the second address for only a selection of one or more processes that call the selection of one or more existing versions of the one or more functions from among a plurality of processes of the application, the selection of one or more processes each comprising one or more attributes matching the at least one selection criteria;

wherein the processor comprises at least one debug register for holding the first address and at least one additional debug register for selecting an execute mode for the at least one debug register, wherein the process triggers an exception in response to a request to execute an instruction at the first address;

in response to a particular process from among the plurality of processes being scheduled to access a particular existing version from among the selection of one or more existing versions of the one or more functions, directing, by a kernel, the processor to set an execute watchpoint by setting a particular debug register from among the at least one debug register with the first address of a first instruction of the particular existing version and setting the additional debug register to an execute mode;

generating, by the kernel, a pairing of the particular existing function and the first address with a particular new version for updating the particular existing version from among the one or more new versions of the selection of the one or more functions and the second address of a first instruction of the particular new version;

adding a particular pair of values of the first address and the second address to a hotpatch list;

in response to receiving control, by the kernel, from an exception triggered by a request to execute the first instruction at the first address, identifying in the hotpatch list the second address paired with the first address in the particular pair of values, only if the particular process is from among the selection of one or more processes each comprising one or more attributes matching the at least one selection criteria;

in response to identifying the second address, returning control, by the kernel, to the processor, with a direction to execute the particular new version at the second address; and in response to the particular process not being from among the selection of one or more processes each comprising one or more attributes matching the at least one selection criteria, returning control, by the kernel, to the processor, to allow execution to continue at the first address.

10. The system according to claim 9, wherein the processor is further configured to perform the actions of:

only allowing at least one other process that does not comprise one or more attributes matching the at least one selection criteria during a first iteration from among the plurality of processes to continue to access the selection of the one or more existing versions;

switching the at least one other process to access the selection of the one or more new versions during a next iteration, wherein during the next iteration the at least one other process comprises one or more attributes matching the selection criteria; and switching the at least one other process to return to only access the selection of the one or more existing versions during a subsequent iteration, wherein during the subsequent iteration the at least one other process does not comprise one or more attributes matching the selection criteria.

11. The system according to claim 9, wherein the processor is further configured to perform the actions of:

receiving the at least one selection criteria comprising one or more static criteria that are applied during runtime at the scheduling of the plurality of processes entering the selection of one or more functions to determine whether to set a watchpoint for generating an exception to selectively transfer control to the second address, the one or more static criteria comprising one or more of a process identifier of a particular process from among the plurality of processes, an owner of the particular process, and a classification of the one or more new versions of the one or more functions, wherein the watchpoint is only set for the selection of the one or more processes each comprising one or more attributes matching the at least one selection criteria.

12. The system according to claim 9, wherein the processor is further configured to perform the actions of:
receiving the at least one selection criteria comprising one or more dynamic criteria that are applied during runtime at the execution the plurality of processes entering the selection of one or more functions, wherein a watchpoint for generating an exception to selectively transfer control to the second address is set at scheduling of each of the plurality of processes and the dynamic criteria is applied after the exception is triggered during execution to determine whether to continue access to the first address or selectively transfer to access at the second address.

13. The system according to claim 9, wherein the processor is further configured to perform the actions of:
determining, by the kernel, when the particular process is being scheduled to access a particular existing version whether the particular process is from among the selection of one or more processes each comprising one or more attributes matching the at least one selection criteria, wherein the at least one selection criteria comprises a static selection that is detectable when the particular process is being scheduled; and
only directing, by the kernel, to set the execute watchpoint if at scheduling the particular process is from among the selection of one or more processes, wherein the resource overhead of setting the execute watchpoint is only used for the selection of one or more processes each comprising one or more attributes matching the at least one selection criteria.

14. The system according to claim 9, wherein the processor is further configured to perform the actions of:
determining, by the kernel, when the particular process is executing whether the particular process is from among the selection of one or more processes each comprising one or more attributes matching the at least one selection criteria, wherein the at least one selection criteria comprises a dynamic selection that is detectable when the particular process is executing.

15. The system according to claim 9, wherein the processor is further configured to perform the actions of:
directing, by the kernel, to set the execute watchpoint by setting the particular debug register from among the at least one debug register with the first address of the first instruction of the particular existing version, setting the particular debug register to the execute mode from among a plurality of modes comprising the execute mode of monitoring instruction execution of the function at the address in the particular debug register, a write mode of monitoring for data writes to the address in the particular debug register, an any input/output read or write mode for monitoring for any input/output initiated read or write to the address in the particular debug register, and a read or write but not instruction fetch for monitoring for a read or write but not an instruction fetch to the address in the particular debug register, and setting a length of data following the address of the first instruction, the one or more processors triggering the exception in response to the request to execute an instruction within the memory space of the first instruction at the address with the length of data.

16. The system according to claim 9, wherein the processor is further configured to perform the actions of:
modifying a kernel exception handler of the kernel to return control to the one or more processes to execute the particular new version at the second address.

17. A computer program product for modifying an application during execution of the application, the computer program product comprising a non-transitory computer readable storage medium having program instructions embodied therewith, the program instructions executable by a processor to cause the processor to:
receive one or more new versions of a selection of one or more functions of a plurality of functions of an application and at least one selection criteria for applying the one or more new versions to the application during execution of the application to update a selection of one or more existing versions of the one or more functions;
update the selection of one or more functions of the application, while the application is running, to comprise the one or more new versions of the selection of one or more functions at a second address while maintaining the selection of the one or more existing versions of the one or more functions at a first address;
selectively transferring control from the selection of one or more existing versions of the one or more functions to the one or more new versions for only a selection of one or more processes that call the selection at the second address of one or more existing versions of the one or more functions from among a plurality of processes of the application, the selection of one or more processes each comprising one or more attributes matching the at least one selection criteria;
in response to a particular process from among the plurality of processes being scheduled to access a particular existing version from among the selection of one or more existing versions of the one or more functions, direct the processor to set an execute watchpoint by setting a particular debug register from among at least one debug register with the first n address of a first instruction of the particular existing version and setting the particular debug register to an execute mode, the processor triggering an exception in response to a request to execute the first instruction at the first address;
generate, by the kernel, a pairing of the particular existing function and the first address with a particular new version for updating the particular existing version from among the one or more new versions of the selection of the one or more functions and the second address of a first instruction of the particular new version;
add a particular pair of values of the first address and the second address to a hotpatch list;
in response to receiving control, by the kernel, from the processor, from an exception triggered by a request to execute the first instruction at the first address, identify in the hotpatch list the second address paired with the first address in the particular pair of values, only if the particular process is from among the selection of one or more processes each comprising one or more attributes matching the at least one selection criteria;

in response to identifying the second address, return control, by the kernel, to the processor, with a direction to execute the particular new version at the second address; and in response to the particular process not being from among the selection of one or more processes each comprising one or more attributes matching the at least one selection criteria, return control, by the kernel, to the processor, to allow execution to continue at the first address.

18. The computer program product according to claim 17, further comprising the program instructions executable by a processor to cause the processor to:

only allow at least one other process that does not comprise one or more attributes matching the at least one selection criteria during a first iteration from among the plurality of processes to continue to access the selection of the one or more existing versions;

switch the at least one other process to access the selection of the one or more new versions during a next iteration, wherein during the next iteration the at least one other process comprises one or more attributes matching the selection criteria; and switch the at least one other process to return to only access the selection of the one or more existing versions during a subsequent iteration, wherein during the subsequent iteration the at least one other process does not comprise one or more attributes matching the selection criteria.

* * * * *